United States Patent
Subramaniam et al.

US006900286B2

(10) Patent No.: US 6,900,286 B2
(45) Date of Patent: May 31, 2005

(54) PROCESS FOR PREPARATION OF CONDUCTING POLYANILINE

(75) Inventors: Radhakrishnan Subramaniam, Pune (IN); Shripad Dagadopant Deshpande, Pune (IN)

(73) Assignee: Council of Scientific and Industrial Research, New Delhi (IN)

( * ) Notice: Subject to any disclaimer, the term of this patent is extended or adjusted under 35 U.S.C. 154(b) by 0 days.

(21) Appl. No.: 10/404,008

(22) Filed: Mar. 31, 2003

(65) Prior Publication Data

US 2004/0198948 A1 Oct. 7, 2004

(51) Int. Cl.$^7$ ............................................. C08G 73/00
(52) U.S. Cl. ................... 528/422; 528/486; 528/488; 528/491; 528/499; 528/502 R; 528/502 A; 528/503
(58) Field of Search ................... 528/422, 486, 528/488, 491, 499, 502 R, 502 A, 503

(56) References Cited

U.S. PATENT DOCUMENTS

| | | | |
|---|---|---|---|
| 5,069,820 A | | 12/1991 | Jen et al. |
| 5,420,237 A | * | 5/1995 | Zemel et al. ............... 528/422 |
| 6,140,462 A | | 10/2000 | Angelopoulos et al. |
| 6,586,565 B2 | * | 7/2003 | Palaniappan ............... 528/422 |
| 2001/0012884 A1 | | 8/2001 | Dhawan et al. |

OTHER PUBLICATIONS

PCT International Search Report.

* cited by examiner

*Primary Examiner*—Duc Truong
(74) *Attorney, Agent, or Firm*—Ladas & Parry LLP

(57) ABSTRACT

The present invention relates to a new process for preparation of conducting polyaniline. More particularly the present invention relates to a simple process for preparation of conducting polyaniline in non acidic medium.

17 Claims, No Drawings

PROCESS FOR PREPARATION OF CONDUCTING POLYANILINE

FIELD OF THE INVENTION

The present invention relates to a new process for preparation of conducting polyaniline. More particularly the present invention relates to a simple process for preparation of conducting polyaniline in non acidic medium.

BACKGROUND OF THE INVENTION

Conducting polymers are increasingly being used for different electronic and electrical applications such as sensors, light emitting diodes, antistatic agents, electromagnetic shielding etc. Amongst the different types of conducting polymers, polyaniline is more extensively used because of its higher stability and processibility. The synthesis of polyaniline generally comprises of polymerizing aniline in aqueous acidic medium at low temperature, using oxidizing agent and initiator. This process is well documented in literature (Ref. Kricheldorf, Handbook of Polymer Synthesis, Pt. B, Marcel Dekker, New York, 1992, p.1390; F. Lux, Polymer, Vol.35, 1994, p.2915, Y. Cao, A. Ndereatta and A. J. Heeger, Polymer, Vol.30, 1989, p.2305). The conventional process is carried out in aqueous solution of protonic acid such as hydrochloric acid (1 mole per mole of aniline), to which is added the oxidising agent/initiator, in the concentration range of 1:1.2 mole per mole of monomer. The polymer is obtained in the powder form which is filtered, washed first with water and then with 2M acidic solution for doping and finally dried. This leads to large number of steps and many disadvantages especially when polyaniline is to be produced on large scale. The polymerization medium being highly acidic, special reactors are required which are corrosion resistant. The subsequent steps are tedious since repeated washing is essential to remove the acid. In many applications, the polymer is required to be dedoped or neutralized with ammonia. This process becomes lengthy due to presence of large amount of acid in the polymer. Also, the spent wash contains large amount of acid which cannot be discharged directly. In order to overcome these drawbacks, it is essential to obtain polyaniline by alternative route which is more environmental friendly, less corrosive and amenable to subsequent treatment of product. The is no prior art for the preparation of conducting polyaniline by non-acidic process.

OBJECTS OF THE INVENTION

The main object of the present invention is to provide a process for obtaining conducting polyaniline directly in non-acidic/non-corrosive medium.

SUMMARY OF THE INVENTION

Accordingly, the present invention provides a process for preparation of conducting polymer which comprises dissolving an oxidizing agent in pure solvent, adding aniline monomer drop wise under agitation, allowing the reaction mixture to remain at temperature ranging from 10° C. to 35° C. for a period ranging from 4 hours to 10 hrs, precipitating the polymer by dumping the reaction mixture in distilled water and separating the polymer by conventional methods to obtain conducting polyaniline.

In one embodiment of the present invention, the oxidizing agent contains electron withdrawing groups and is selected from the group consisting of alkali metal salts with dichromate, persulfate and perchlorate ions, benzoyl peroxide and ferric chloride.

In another embodiment of the present invention, the oxidizing agent used is in concentration range of 0.1 molar to 2 molar, preferably 1.1 molar of the reactant.

In yet another embodiment of the present invention, the solvent used contains polar groups and has high dielectric constant more than 40 and is chosen from solvents such as water, n-methyl pyrrolidone, di-methyl sulfoxide, di-methyl formamide, acetonitrile and methanol or mixtures thereof.

In another embodiment of the invention, the monomer used is an aromatic compound containing nitrogen and selected from the group consisting of aniline, substituted aniline, anisidine, toluidine and their substituted derivatives in a concentration in the range of 0.01 to 0.5 mol preferably 0.1 to 0.2 mol.

In a feature of the present invention, the secondary doping is optionally carried out after the filtration of the polymer powder using protonic acids.

DETAILED DESCRIPTION OF THE INVENTION

The present invention provides a process for preparation of conducting polymer which comprises dissolving an oxidizing agent in pure solvent, adding aniline monomer drop wise under agitation, allowing the reaction mixture to remain at temperature ranging from 10° C. to 35° C. for a period ranging from 4 hours to 10 hrs, precipitating the polymer by dumping the reaction mixture in distilled water and separating the polymer by conventional methods to obtain conducting polyaniline.

The oxidizing agent contains electron withdrawing groups and is selected from the group consisting of alkali metal salts with dichromate, persulfate and perchlorate ions, benzoyl peroxide and ferric chloride. The oxidizing agent used is in concentration range of 0.1 molar to 2 molar, preferably 1.1 molar of the reactant.

The solvent used contain polar groups and has high dielectric constant more than 40 and is chosen from solvents such as water, n-methyl pyrrolidone, di-methyl sulfoxide, di-methyl formamide, acetonitrile and methanol or mixtures thereof. The monomer used is an aromatic compound containing nitrogen and selected from the group consisting of aniline, substituted aniline, anisidine, toluidine and their substituted derivatives in a concentration in the range of 0.01 to 0.5 mol preferably 0.1 to 0.2 mol. In a feature of the present invention, the secondary doping is optionally carried out after the filtration of the polymer powder using protonic acids.

The process of the present invention is described hereinbelow with reference to the following examples, which are illustrative and should not be construed to limit the scope of the invention in any manner.

EXAMPLE-1

Potassium persulfate (5.95 g) was dissolved in 150 ml distilled water and stirred for 15 minutes. Aniline (2.0 ml) was added drop wise with constant stirring and the reaction was allowed to proceed for 24 hr at 30° C. when the solution was found to become dark green. The polyaniline powder was precipitated by dumping the reaction mixture in 500 ml distilled water, followed by filtration and drying by conventional methods given in example-1 of the present invention. The polymer powder obtained has characteristics as given in Table-I.

EXAMPLE-2

Ferric chloride (1.77 g) was dissolved in 150 ml distilled water and stirred for 15 minutes. Aniline (2.0 ml) was added drop wise with constant stirring and the reaction was allowed to proceed for 24 hr at 30° C. when the solution was found to become dark green. The polyaniline powder was precipitated by dumping the reaction mixture in 500 ml distilled water, followed by filtration and drying by conventional methods given in example-1 of the present invention. The polymer powder obtained has characteristics as given in Table-I.

EXAMPLE-3

Benzoyl peroxide (1.77 g) was dissolved in 150 ml distilled water and stirred for 15 minutes. Aniline (2.0 ml) was added drop wise with constant stirring and the reaction was allowed to proceed for 24 hr at 30° C. when the solution was found to become dark green. The polyaniline powder was precipitated by dumping the reaction mixture in 500 ml distilled water, followed by filtration and drying by conventional methods given in Example-1 of the present invention. The polymer powder obtained has characteristics as given in Table-I.

EXAMPLE-4

The ammonium per sulfate (5.3 g) was dissolved in 150 ml distilled water and stirred for 15 min. Aniline (2.04 g) was added to the above solution with constant stirring and the reaction allowed to proceed for 24 hr at 32° C. The polymer powder was precipitated by dumping the reaction mixture in 500 ml distilled water followed by filtration, washing with water and drying in air and under vacuum. The polymer powder obtained has characteristics as given in Table-I.

TABLE I

Data on polyaniline synthesized without acid

| "Example Number | Oxidant Used | Aniline Used (ml) | Oxidant used (2 ms) | Yield (%) | Conductivity (S/cm) | Optical Density at 800 nm |
|---|---|---|---|---|---|---|
| 1 | Potassium Persulphate | 2.0 | 5.95 | 83.32 | $5.26 \times 10^{-5}$ | 0.24 |
| 2 | Ferric Chloride | 2.0 | '1.20 | 87.5 | $1.48 \times 10^{-4}$ | 0.30 |
| 3 | Benzoyl Peroxide | 2.0 | 1.77 | 75.0 | $5.0 \times 10^{-5}$ | 0.10 |
| 4 | Ammonium Persulphate | 2.0 | 5.3 | 87.17 | $6.88 \times 10^{-5}$ | 0.28 |

The above observations clearly indicate that substantial polyaniline (as detected by the characteristic absorption at 800 nm) is obtained in non-acidic medium by the process described in the present invention.

The main advantage of the present invention is that the conducting polymer is formed without using any acid in the reaction medium. Thus, this invention provides a process for preparing conducting polyaniline in non-corrosive, environmental friendly, non hazardous conditions.

We claim:

1. A process for preparation of conducting polymer which comprises the steps of: (a) dissolving an oxidizing agent in a solvent, (b) adding aniline monomer drop wise under agitation to form a reaction mixture, and allowing the reaction mixture to remain at a temperature ranging from 10° C. to 35° C. for a period ranging from 4 hours to 10 hrs, said steps (a) and (b) being carried out in a non-acidic medium, (c) precipitating the polymer by dumping the reaction mixture in distilled water and (d) separating the polymer to obtain conducting polyaniline.

2. A process as claimed in claim 1 wherein the oxidizing agent contains electron withdrawing groups.

3. A process as claimed in claim 2 wherein the oxidizing agent is selected from the group consisting of alkali metal salts with dichromate, persulfate and perchlorate ions, benzoyl peroxide and ferric chloride.

4. A process as claimed in claim 1 wherein the oxidizing agent is used in concentration in the range of 0.1 molar to 2 molar of the reactant.

5. A process as claimed in claim 4 wherein the concentration of the oxidizing agent is 1.1 molar of the reactant.

6. A process as claimed in claim 1 wherein the solvent used contains polar groups and has a dielectric constant of greater than 40.

7. A process as claimed in claim 1 wherein the solvent is selected from the group consisting of water, n-methyl pyrrolidone, di-methyl sulfoxide, di-methyl formamide, acetonitrile, methanol and any mixture thereof.

8. A process as claimed in claim 1 wherein the aniline monomer used is an aromatic compound containing nitrogen.

9. A process as claimed in claim 8 wherein the aniline monomer is selected from the group consisting of aniline, substituted aniline, anisidine, toluidine and their substituted derivatives.

10. A process as claimed in claim 1 wherein the aniline monomer is used in a concentration in the range of 0.01 to 0.5 mol.

11. A process as claimed in claim 10 wherein the aniline monomer is used in a concentration in the range of 0.1 to 0.2 mol.

12. A process as claimed in claim 1 wherein the obtained polymer is subjected to a secondary doping after filtration of the polymer powder using protonic acids.

13. A process as claimed in claim 1, wherein the process consists essentially of steps (a) to (d).

14. A process as claimed in claim 1, wherein the solvent is a pure solvent.

15. A process as claimed in claim 1, wherein the solvent is selected from the group consisting of n-methyl pyrrolidone, di-methyl sulfoxide, di-methyl formamide, acetonitrile methanol and a mixture thereof.

16. A process as claimed in claim 15, wherein the aniline monomer is an aromatic compound containing nitrogen.

17. A process as claimed in claim 16, wherein the process consists essentially of the steps (a) to (d).

* * * * *